US008977847B1

(12) United States Patent
Juels

(10) Patent No.: US 8,977,847 B1
(45) Date of Patent: Mar. 10, 2015

(54) DISTRIBUTED CHALLENGE-RESPONSE AUTHENTICATION

(71) Applicant: EMC Corporation, Hopkinton, MA (US)

(72) Inventor: Ari Juels, Brookline, MA (US)

(73) Assignee: EMC Corporation, Hopkinton, MA (US)

( * ) Notice: Subject to any disclaimer, the term of this patent is extended or adjusted under 35 U.S.C. 154(b) by 140 days.

(21) Appl. No.: 13/798,542

(22) Filed: Mar. 13, 2013

(51) Int. Cl.
*H04L 29/06* (2006.01)
*H04L 9/32* (2006.01)

(52) U.S. Cl.
CPC .................................... *H04L 9/32* (2013.01)
USPC .......................................................... 713/162

(58) Field of Classification Search
None
See application file for complete search history.

(56) References Cited

U.S. PATENT DOCUMENTS

| 6,662,299 | B1 * | 12/2003 | Price, III | 713/171 |
| 8,661,254 | B1 * | 2/2014 | Sama | 713/168 |
| 8,745,710 | B1 * | 6/2014 | Roth et al. | 726/6 |
| 2003/0221102 | A1 * | 11/2003 | Jakobsson et al. | 713/171 |

OTHER PUBLICATIONS

RSA Distributed Credential Protection, White Paper, EMC [Online], 2012 [retrieved on Nov. 23, 2014] Retrieved from the Internet: <URL:http://www.emc.com/collateral/software/white-papers/h11013-rsa-dcp-0812-wp.pdf>.*
"RSA Distributed Credential Protection," http://www.emc.com/security/rsa-distributed-credential-protection.htm, 2013, 2 pages.
J. Brainard et al., "A New Two-Server Approach for Authentication with Short Secrets," 12th USENIX Security Symposium, Aug. 2003, pp. 201-214.
J. Camenisch et al., "Practical Yet Universally Composable Two-Server Password-Authenticated Secret Sharing," ACM Conference on Computer and Communications Security (CCS), Oct. 2012, pp. 525-536.
M. Szydlo et al., "Proofs for Two-Server Password Authentication," The Cryptographers' Track at the RSA Conference, Topics in Cryptology—CT-RSA, Feb. 2005, pp. 227-244.

* cited by examiner

*Primary Examiner* — Samson Lemma
*Assistant Examiner* — Malcolm Cribbs
(74) *Attorney, Agent, or Firm* — Ryan, Mason & Lewis, LLP

(57) ABSTRACT

A distributed challenge-response protocol is carried out between a verifier and a prover. The verifier comprises servers storing respective shares of a set of challenge-response pairs. A particular challenge of one of the challenge-response pairs is sent to the prover, and a response to the challenge is received from the prover. The received response is authenticated as an appropriate response to the particular challenge based on indications from respective ones of at least a subset of the servers as to whether or not the received response matches respective reconstructed responses computed by those servers. A given one of the servers may be configured to reconstruct the particular challenge using information associated with the share stored in the given server and information associated with at least one other share stored in at least one other server, with the reconstructed challenge being to be sent to the prover as the particular challenge.

23 Claims, 3 Drawing Sheets

DISTRIBUTED CHALLENGE-RESPONSE AUTHENTICATION

FIELD

The field relates generally to cryptography, and more particularly to distributed cryptography.

BACKGROUND

Symmetric-key challenge-response authentication is used in a variety of different authentication applications, including one-time passcode (OTP) authentication tokens and authentication systems based on radio frequency identification (RFID) or near field communication (NFC). Such applications typically involve the sharing of a symmetric key κ between a prover and a verifier. In a conventional challenge-response protocol, the verifier sends a random challenge c to the prover, the prover returns a response $r=f_\kappa(c)$, where $f_\kappa(c)$ denotes a symmetric-key primitive, and the verifier checks r using its locally-stored copy of the symmetric key κ. However, in such a protocol, compromise of the verifier results in direct compromise of the symmetric key κ and thus adversarial ability to impersonate the corresponding prover.

Numerous conventional authentication systems make use of distributed cryptography arrangements. For example, in a typical distributed cryptography arrangement, a secret value is stored in a distributed manner across multiple servers instead of being stored in its entirety on a single server, as a basic defense against compromise of the single server. Efficient distributed cryptographic protocols are known for use in these and other settings, including protocols for operations such as digital signing, key generation, encryption and decryption.

Most of these known distributed cryptographic protocols rely on homomorphic properties inherent in public-key cryptographic primitives, which generally allow partial operations executed with individual key shares to be combined to achieve an operation with a complete private key.

Unfortunately, conventional distributed cryptographic protocols are usually not appropriate for use in authentication systems that require verification of secret values constructed using symmetric-key primitives.

Efficient execution of standard symmetric-key primitives typically requires that at least one server or other participating distributed entity have full knowledge of the corresponding key. For example, to encrypt a message m under symmetric key κ using the Advanced Encryption Standard (AES), a participating distributed entity must know both κ and m. Accordingly, verification of a secret value derived using symmetric-key operations would appear to expose one or more of the distributed entities to potential compromise.

Although fully distributed verification of a secret value based purely on symmetric-key operations is possible using security multiparty computation techniques, these techniques require excessive bandwidth and computational resources.

It is apparent from the foregoing that a need exists for a distributed challenge-response protocol that can accommodate symmetric-key primitives.

SUMMARY

Illustrative embodiments of the present invention provide distributed challenge-response authentication techniques that are particularly well-suited for use in symmetric-key authentication applications. These embodiments involve storing in multiple servers distinct shares of a set of challenge-response pairs. Arrangements of this type can advantageously eliminate situations in which a server or other distributed entity is exposed to potential compromise, while also avoiding the excessive bandwidth and computational requirements associated with security multiparty computation techniques. Moreover, symmetric-key embodiments can be configured such that the symmetric key is never exposed to any of the servers, even during an authentication session.

In one embodiment, a distributed challenge-response protocol is carried out between a verifier and a prover. The verifier comprises a plurality of servers storing respective shares of a set of challenge-response pairs. A particular challenge of one of the challenge-response pairs is sent to the prover, and a response to the challenge is received from the prover. The received response is authenticated as an appropriate response to the particular challenge based on indications from respective ones of at least a subset of the servers as to whether or not the received response matches respective reconstructed responses computed by those servers.

The particular challenge sent to the prover in the distributed challenge-response protocol may be a reconstructed challenge generated by one of the servers. For example, a given one of the servers may be configured to reconstruct the particular challenge using information associated with the share stored in the given server and information associated with at least one other share stored in at least one other server, thereby permitting the reconstructed challenge to be sent to the prover as the particular challenge.

Also, at least the given server of the plurality of servers may be configured to compute its reconstructed response using information associated with the share stored in that server and information associated with at least one other share stored in at least one other server of the plurality of servers.

The verifier may be configured such that each of the challenge-response pairs and the corresponding portions of the shares stored in the respective servers are utilized for only a single authentication session.

The set of challenge-response pairs in a given embodiment may comprise a set of n challenge-response pairs $\{c_i, r_i = f_\kappa(c_i)\}_{i=1}^n$ where $c_i \in_R K$ and $f_\kappa(c_i) \in K$ is a symmetric-key primitive based on a symmetric key κ. Numerous other types of challenge-response pairs may be used in other embodiments.

Embodiments of the invention can be implemented in a wide variety of different cryptographic applications, but as indicated above are particularly well-suited for use in symmetric-key authentication applications.

DETAILED DESCRIPTION

Illustrative embodiments of the present invention will be described herein with reference to exemplary communication systems and associated servers, clients and other processing devices. It is to be appreciated, however, that the invention is not restricted to use with the particular illustrative system and device configurations shown. Accordingly, the term "communication system" as used herein is intended to be broadly construed, so as to encompass, for example, systems in which multiple processing devices communicate with one another but not necessarily in a manner characterized by a client-server model.

As will be described, the present invention in one or more illustrative embodiments provides techniques for distributed challenge-response authentication. Such techniques may be implemented at least in part using authentication tokens, authentication servers and other types of cryptographic devices.

Figure 1:
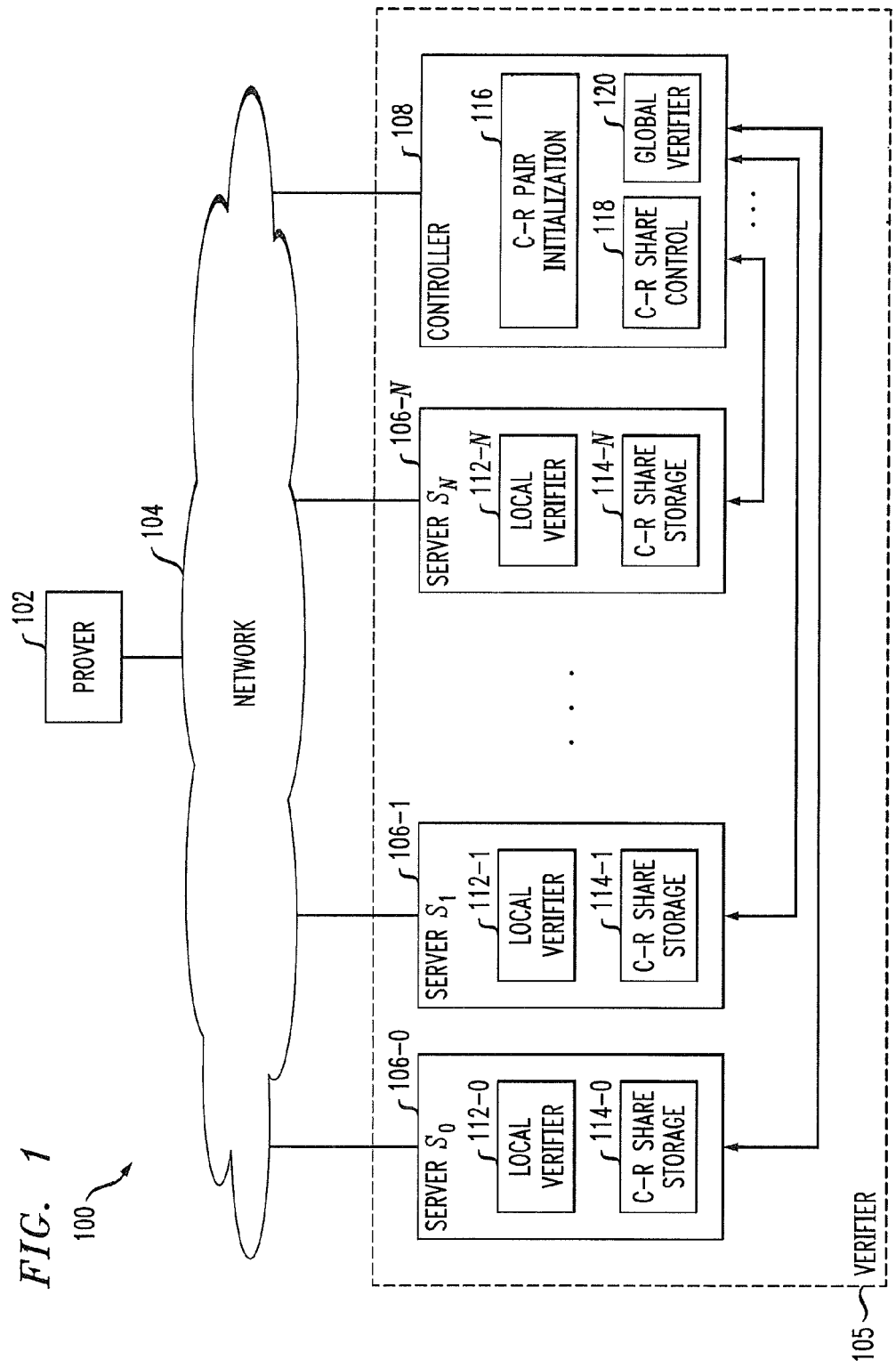
FIG. 1 is a block diagram of a communication system that implements a distributed challenge-response protocol using a verifier comprising multiple servers in an illustrative embodiment of the invention.

FIG. 1 shows a communication system 100 that incorporates functionality for distributed challenge-response authentication in an illustrative embodiment. The system 100 comprises a prover 102 that communicates over a network 104 with a verifier 105. The prover 102 and verifier 105 carry out a challenge-response authentication protocol, as will be described in greater detail below. The prover and verifier may comprise, for example, a client device and an authentication system, respectively, although other types of prover and verifier entities may be used in other embodiments. Also, it is possible that the same system entity may serve as both a prover and a verifier, in different protocol instances.

The verifier 105 comprises a plurality of servers 106-0, 106-1, . . . 106-N coupled to a controller 108. It is assumed in the present embodiment that the prover 102 is able to communicate over the network 104 with each of the servers 106 and the controller 108, although other arrangements can be used in other embodiments. For example, in some embodiments, communication between the prover 102 and one or more of the servers 106 may flow through the controller 108.

The prover 102 may comprise, for example, a mobile telephone, laptop computer, tablet computer or other user device having an associated hardware or software authentication token. In such an arrangement, the authentication token may comprise a time-synchronous authentication token such as an RSA SecurID® user authentication token. The prover 102 may be a system entity associated with a particular user, where "user" as the term is applied herein should be generally construed so as to encompass a human user or an associated hardware or software entity. Numerous alternative arrangements are possible.

The network 104 may comprise, for example, a global computer network such as the Internet, a wide area network (WAN), a local area network (LAN), a satellite network, a telephone or cable network, a cellular network, a wireless network such as WiFi or WiMAX, or various portions or combinations of these and other types of networks.

The servers 106-0, 106-1, . . . 106-N are also denoted in the figure as servers $S_0, S_1, \ldots S_N$, respectively. The controller 108 is configured to provide the servers 106 with respective shares of a set of challenge-response pairs for use in conjunction with execution of the above-noted challenge-response protocol. The term "share" as used in this context is intended to be broadly construed, and may comprise any information from which at least one of challenges and responses of the set of challenge-response pairs can be reconstructed or otherwise determined by the corresponding server 106. Thus, in some embodiments, the share of a given server may be configured to allow that server to reconstruct both challenges and responses, while in other embodiments the share may be configured to allow reconstruction of only the challenges or only the responses, with the remaining portions of the set of challenge-response pairs being directly stored on the server rather than reconstructed. Other types and arrangements of shares can also be used.

In accordance with the protocol, a particular challenge of one of the challenge-response pairs is sent to the prover 102 by the verifier 105 generally or by a specific component thereof, such as one of the servers 106. The term "challenge-response" is abbreviated as C-R in various components of FIG. 1.

Although not expressly shown in the figure, one or more additional components may be included in system 100, such as a relying server that relies on an authentication result produced by the verifier 105 upon completion of an instance of the challenge-response authentication protocol. In other embodiments, a relying server of this type may instead be one or more of the servers 106, or another element of the verifier 105, as well as various components that may receive authentication decisions from the verifier.

The servers 106-0, 106-1, . . . 106-N comprise respective local verifiers 112-0, 112-1, . . . 112-N each configured to generate an indication as to whether or not a response received from prover 102 to a particular challenge of one of the challenge-response pairs matches a reconstructed response computed by that server. The particular challenge may be, for example, a reconstructed challenge generated by a given one of the servers 106 utilizing its share of the set of challenge-response pairs. In such an arrangement, the given server reconstructs the particular challenge using information associated with the share stored in the given server and information associated with at least one other share stored in at least one other server of the set of servers 106 of verifier 105. The reconstructed challenge is then sent to the prover 102 as the particular challenge.

The response received from the prover 102 is authenticated by the verifier 105 as an appropriate response to the particular challenge based on indications from respective ones of at least a subset of the servers 106 as to whether or not the received response matches respective reconstructed responses computed by those servers. Each of the servers 106 computes its reconstructed response using information associated with the share stored in that server and information associated with at least one other share stored in at least one other server of the set of servers 106.

The above-noted shares of the challenge-response pairs are stored in respective challenge-response share storage elements 114-0, 114-1, . . . 114-N comprising designated portions of respective memories of the servers 106.

The controller 108 generates a given set of challenge-response pairs using a challenge-response pair initialization module 116, and generates the corresponding shares for the respective servers 106 using a challenge-response share control module 118. The controller 108 further comprises a global verifier 120 configured to authenticate the prover 102 based on the indications generated by at least a subset of the servers 106. For example, the global verifier 120 may be configured to authenticate the received response from the prover 102 as an appropriate response to the particular challenge based on indications from respective ones of at least a subset of the servers 106 as to whether or not the received response matches respective reconstructed responses computed by those servers.

Although shown as being separate from the servers 106 in the present embodiment, the controller 108 in other embodiments may be implemented at least in part in one or more of the servers 106. In embodiments of this type, at least a portion of the controller 108 may be in the form of a distributed entity that is distributed over at least a subset of the servers 106. It is also possible that at least a portion of the controller 108 may be implemented in another system element, such as a relying server. Thus, for example, the above-noted relying server may implement at least the global verifier 120 of the controller 108, and may be considered part of the verifier 105.

The prover 102, servers 106 and controller 108 may be implemented as respective processing devices. A given such processing device may comprise, for example, a computer or other type of processing device configured to communicate with other such devices over the network 104. Each such processing device generally comprises at least one processor and an associated memory, and implements one or more functional modules for controlling certain features of the system 100.

The processor may comprise a microprocessor, a microcontroller, an application-specific integrated circuit (ASIC), a field-programmable gate array (FPGA) or other type of processing circuitry, as well as portions or combinations of such circuitry elements.

The memory may comprise random access memory (RAM), read-only memory (ROM) or other types of memory, in any combination. Such a memory and other memories disclosed herein may be viewed as examples of what are more generally referred to as "computer program products" storing executable computer program code.

Various elements of the system 100, such as the local verifiers 112 of the respective servers 106 and the global verifier 120 and challenge-response pair initialization and share control modules 116 and 118 of the controller 108, may be implemented at least in part in the form of software that is stored in a memory of a processing device and executed by a processor of that processing device.

The system 100 in the present embodiment implements one or more processes for distributed challenge-response authentication. Examples of such a process performed at least in part in conjunction with the prover 102 authenticating to the verifier 105 will be described below, but it should be understood that numerous other types of processes may be used in other embodiments.

Also, it is to be appreciated that the particular set of elements shown in FIG. 1 for providing distributed challenge-response authentication is presented by way of example, and in other embodiments additional or alternative elements may be used. Thus, another embodiment may include additional networks and additional sets of servers, controllers or other system components.

As mentioned previously, various elements of system 100 such as provers, servers, controllers or their associated functional modules may be implemented at least in part in the form of software. Such software is stored and executed utilizing respective memory and processor elements of at least one processing device. The system 100 may include additional or alternative processing platforms, as well as numerous distinct processing platforms in any combination, with each such platform comprising one or more computers, storage devices or other types of processing devices. Examples of such processing platforms that may form at least a portion of the system 100 will be described below in conjunction with FIGS. 3 and 4.

The operation of the system 100 will now be described in greater detail with reference to the protocol diagram of FIG. 2, which illustrates a set of operations performed by two servers 106 of the verifier 105 carrying out a challenge-response protocol with the prover 102 in an illustrative embodiment. Thus, in this embodiment, it is assumed for simplicity and clarity of illustration that there are only two servers $S_0$ and $S_1$. Those skilled in the art will recognize that the described two-server embodiment can be extended in a straightforward manner to other embodiments that include more than two servers.

Figure 2:
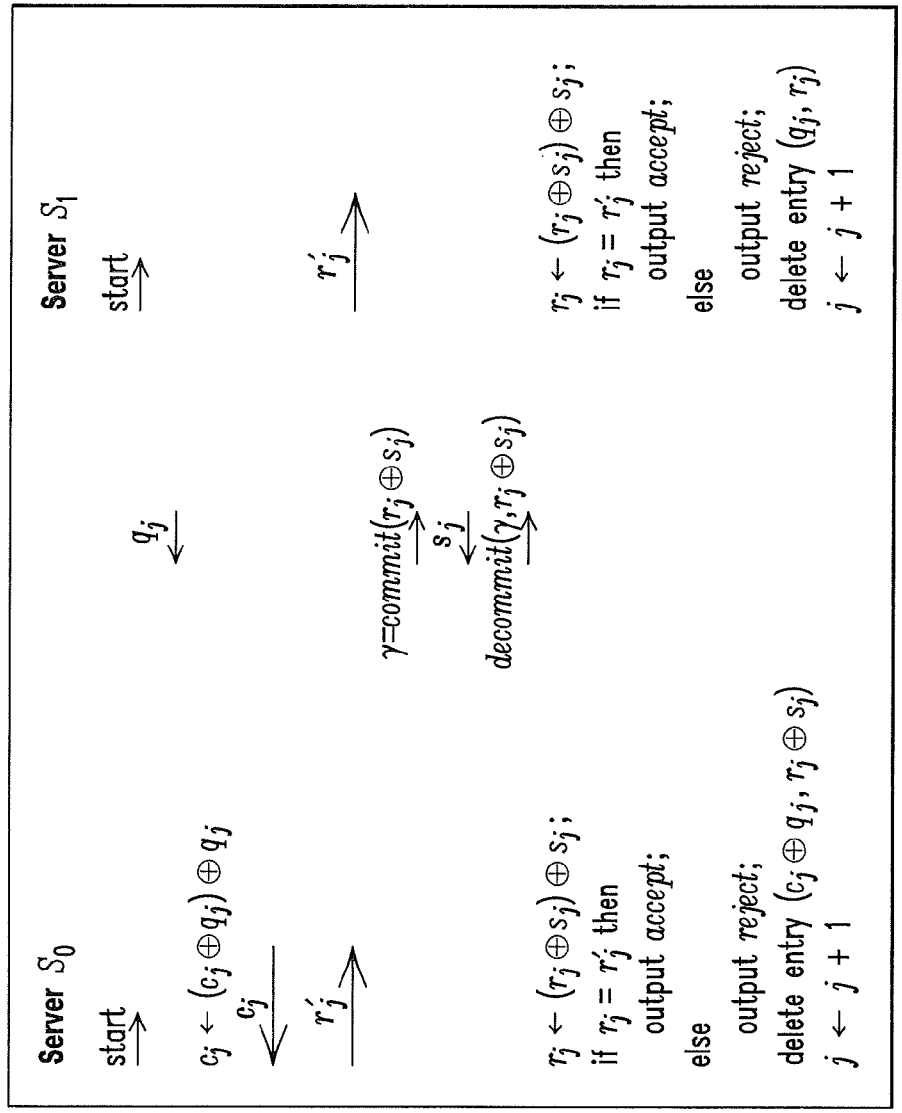
FIG. 2 is a protocol diagram illustrating an exemplary distributed challenge-response protocol performed in the FIG. 1 system.

It should also be appreciated that the particular features of the described two-server embodiment of FIG. 2 are presented by way of example only, and other embodiments need not incorporate these features.

In the FIG. 2 embodiment, the set of challenge-response pairs is assumed to comprise a set of n challenge-response pairs $\{(c_i, r_i)\}_{i=1}^n$ computed using a symmetric key $\kappa$ selected from a keyspace K More particularly, the set of n challenge-response pairs comprises a set of n challenge-response pairs $\{c_i, r_i=f_\kappa(c_i)\}_{i=1}^n$ where $c_i \epsilon_R K$ and $f_\kappa(c_i) \epsilon K$ is a symmetric-key primitive based on the symmetric key $\kappa$. Any type of symmetric-key primitive may be used. Other types of challenge-response pairs may be used in other embodiments, and need not be based on symmetric-key primitives.

The above-noted keyspace K in the present embodiment may be specified as $K=\{0,1\}^{128}$, such that K is the space of all 128-bit strings, although other string lengths or types of keyspaces may be used.

The set of challenge-response pairs $\{c_i, r_i=f_\kappa(c_i)\}_{i=1}^n$ as described above are generated by the challenge-response pair initialization module 116 of controller 108.

The challenge-response share control module 118 generates shares of the set of challenge-response pairs for the servers 106. These shares are stored in the respective storage elements 114 of the respective servers. In this two-server embodiment, the share for the first server $S_0$ comprises a set $\{c_i \oplus q_i, r_i \oplus s_i\}_{i=1}^n$ and the share for the second server $S_1$ comprises a set $\{q_i, s_i\}_{i=1}^n$, where $s_i \epsilon_R K$. Accordingly, in this embodiment, the set $\{q_i, s_i\}_{i=1}^n$ is randomly selected for $s_i \epsilon_R K$, with server $S_0$ storing $\{c_i \oplus q_i, r_q \oplus s_i\}_{i=1}^n$ as its share, while server $S_1$ stores $\{q_i, s_i\}_{i=1}^n$ as its share. Again, other types of shares of a given set of challenge-response pairs may be used in other embodiments.

It is further assumed that each of the challenge-response pairs and corresponding portions of the shares are utilized for only a single authentication session, although this assumption, like other assumptions herein, need not apply in other embodiments.

Referring now more particularly to the protocol diagram of FIG. 2, operations performed by first server $S_0$ are shown on the left side of the diagram, and operations performed by second server $S_1$ are shown on the right side of the diagram. Interactions between these servers and the prover 102 are shown by larger arrows. The controller 108 initiates the protocol via a start command applied to each of the servers $S_0$ and $S_1$ as indicated at the top of the diagram. Also, outputs generated by the servers are assumed to be provided back to the global verifier 120 of the controller 108, although these and other interactions between the servers and the controller 108 are not explicitly shown in this protocol diagram. All protocol flows in this embodiment may be tagged with a unique session identifier.

In this embodiment, the first server $S_0$ reconstructs a particular challenge $c_j$ for a current authentication session identified by a session counter j, where j=1, . . . n. Here, $c_j$ more particularly denotes a challenge of a j-th one of the challenge-response pairs in the set of n challenge-response pairs. Although not explicitly indicated in the figure, the session counter j is assumed to be initialized to 0 in conjunction with initialization of the set of challenge-response pairs.

The challenge reconstruction portion of the protocol begins with the first server $S_0$ receiving $q_j$ from the second server $S_1$. As indicated above, $q_j$ is part of the share stored in the second server $S_1$. The first server $S_0$ then reconstructs the particular challenge $c_j$ by computing $c_j=(c_j \oplus s_j) \oplus s_j$, and the reconstructed challenge $c_j$ is sent to the prover 102. Although challenge reconstruction takes place on server $S_0$ in this embodiment, in other embodiments it could take place on server $S_1$, or on a third, distinct server.

The reconstructed challenge $c_j$ is assumed in this embodiment to be sent to the prover 102 by the first server $S_0$, as indicated by the large left-directed arrow on the left side of the diagram, although in other embodiments it could be sent to the prover 102 by another system entity, such as controller 108.

Each of the first and second servers $S_0$ and $S_1$ receives a response to the particular challenge from the prover 102, as indicated by the large right-directed arrows on the left and right sides of the diagram. The received response to the reconstructed challenge in the present embodiment comprises a response of the form $r'_j = f_K(c_j)$, which is computed and sent by the prover 102.

The response may be received directly in each server from the prover 102, although other arrangements are possible. For example, the prover may provide a single response to the controller 108, with the controller forwarding or otherwise providing the response to each of the servers. Alternatively, the prover 102 may provide a single response to one of the servers, which would then forward the response to the other server.

Also, each of the first and second servers $S_0$ and $S_1$ reconstructs response $r_j$ corresponding to reconstructed challenge $c_j$ of the j-th one of the challenge-response pairs in the set of n challenge-response pairs. Reconstructing response $r_j$ in a given one of the first and second servers $S_0$ and $S_1$ comprises computing $r_j = (r_j \oplus s_j) \oplus s_j$. In this portion of the protocol, the first server $S_0$ sends a commitment $\gamma = \text{commit}(r_j \oplus s_j)$ to the second server $S_1$, and receives $s_j$ from the second server $S_1$ in response to the commitment. The first server $S_0$ subsequently sends a decommitment $\text{decommit}(\gamma, r_j \oplus s_j)$ to the second server $S_1$, such that both servers $S_0$ and $S_1$ are able to compute $r_j = (r_j \oplus s_j) \oplus s_j$. As indicated above, $r_j \oplus s_j$ is part of the share stored in the first server $S_0$, and $s_j$ is part of the share stored in the second server $S_1$. Each of the first and second servers $S_0$ and $S_1$ outputs an accept indication if $r'_j = r_j$ at that server and otherwise outputs a reject indication.

Finally, each of the first and second servers $S_0$ and $S_1$ deletes at least a portion of its corresponding share of the j-th challenge-response pair, and increments the session counter j. The servers thus respectively delete information associated with their $j^{th}$ challenge-response shares, and possibly the entire shares. This deletion operation as illustrated in the figure more specifically involves servers $S_0$ and $S_1$ deleting their respective entries $(c_j \oplus q_j, r_j \oplus s_j)$ and $(q_j, r_j)$, and possibly additional information associated with their respective shares or other results of computations based on the shares. There remain n−j challenge-response pairs for use in subsequent iterations of the protocol.

With regard to security of the FIG. 2 embodiment, consider an adversary that actively corrupts the first server $S_0$ and attempts to impersonate the prover 102. The server $S_0$ is the server that issues the challenges, and therefore the more powerful of the two servers in this embodiment. The adversary can cause $S_0$ to issue whatever challenge the adversary chooses. However, without the participation of a valid prover, the adversary cannot feasibly learn $r_j$ prior to receipt of $r'_j$ by the second server $S_1$. Thus, the adversary cannot feasibly cause $S_1$ to receive $r'_j = r_j$. Nor can the adversary cause an incorrect reconstruction of $r_j$ in server $S_1$. The authentication attempt will therefore be rejected.

In addition, after a single use, valid or invalid, a given challenge-response pair is erased or otherwise eliminated. Consequently, the adversary cannot reuse a given challenge-response pair once it has been used.

It should also be noted that the adversary cannot harvest useful challenge-response pairs during contact with the prover 102 prior to protocol execution. Although the adversary can mount man-in-the-middle attacks, this is a general problem, and not a byproduct of the particular protocol.

To summarize, in the FIG. 2 embodiment, the adversary cannot feasibly impersonate a valid prover 102. Nor can it, through transient contact with the prover, harvest useful challenge-response pairs prior to an authentication attempt. The challenge-response pairs are instead used as respective one-time authentication values, permitting their exposure during the course of authentication without undermining system security. The underlying symmetric key of the prover is never exposed during an authentication session.

The particular processing operations and other system functionality described in conjunction with the protocol diagram of FIG. 2 are presented by way of illustrative example only, and should not be construed as limiting the scope of the invention in any way. Alternative embodiments can use other types of processing operations for distributed challenge-response authentication. For example, the ordering of the operations may be varied in other embodiments, or certain operations may be performed concurrently with one another rather than serially. Also, other types of information may be exchanged between the prover 102 and servers 106 or other related entities such as controller 108.

Again, the FIG. 2 embodiment relates to an exemplary arrangement in which it is assumed for simplicity and clarity of illustration that there are only two servers $S_0$ and $S_i$ participating in the protocol. Those skilled in the art will recognize that the described two-server embodiment can be extended in a straightforward manner to other embodiments that include more than two servers.

For example, illustrative (2,3)-thresholding embodiments using three servers $S_0$, $S_1$, and $S_2$ may be constructed in a straightforward manner. In such embodiments, the threshold for successful authentication is at least two out of the three servers issuing accept decisions. Alternative thresholding arrangements may be utilized involving different numbers of servers and different threshold requirements.

These multiple server arrangements can generally be described as ($N_{TH}$, N)-thresholding embodiments in which $N_{TH}$ denotes the threshold subset of the total number N of servers that are required for successful authentication, where $N_{TH} \leq N$.

In some embodiments, challenge-response values shared across the multiple servers may be re-randomized on a periodic basis using standard proactivization techniques that are known to those skilled in the art.

As noted above, many different share arrangements may be used among the servers 106. For example, although both challenges and responses of a given set of challenge-response pairs are utilized to generate shares distributed among the servers in the FIG. 2 embodiment, other embodiments may involve utilizing only the responses, or only the challenges, to generate the server shares, with the remaining portions of the set of challenge-response pairs being stored directly on each server.

It should again be noted that challenge-response authentication functionality such as that described in conjunction with FIGS. 1 and 2 can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The embodiments described in conjunction with FIGS. 1 and 2 can provide a number of significant advantages relative to conventional practice. For example, these embodiments can advantageously eliminate situations in which a server or other distributed entity is exposed to potential compromise, while also avoiding the excessive bandwidth and computational requirements associated with security multiparty computation techniques. Moreover, symmetric-key embodiments can be configured such that the symmetric key is never exposed to any of the servers, even during an authentication session. Accordingly, these embodiments remain secure even in the event of compromise of a subset of the set of servers 106.

Challenge-response authentication processes in other embodiments may make use of one or more operations commonly used in the context of conventional authentication processes. Examples of conventional authentication processes are disclosed in A. J. Menezes et al., Handbook of Applied Cryptography, CRC Press, 1997, which is incorporated by reference herein. These conventional processes, being well known to those skilled in the art, will not be described in further detail herein, although embodiments of the present invention may incorporate aspects of such processes.

As indicated previously, the communication system 100 may be implemented using one or more processing platforms. One or more of the processing modules or other components of system 100 may therefore each run on a computer, storage device or other processing platform element. A given such element may be viewed as an example of what is more generally referred to herein as a "processing device."

Figure 3:
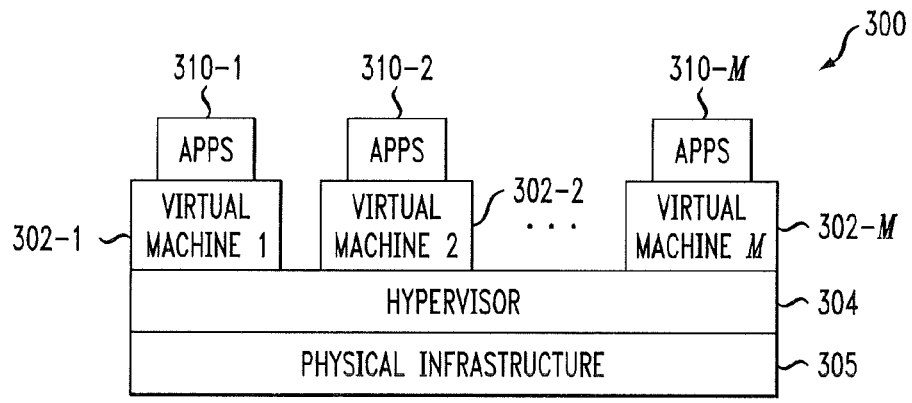
FIGS. 3 and 4 show examples of processing platforms that may be utilized to implement at least a portion of the communication system of FIG. 1.

Referring now to FIG. 3, one possible processing platform that may be used to implement at least a portion of one or more embodiments of the invention comprises cloud infrastructure 300. The cloud infrastructure 300 in this exemplary processing platform comprises virtual machines (VMs) 302-1, 302-2, . . . 302-M implemented using a hypervisor 304. The hypervisor 304 runs on physical infrastructure 305. The cloud infrastructure 300 further comprises sets of applications 310-1, 310-2, . . . 310-M running on respective ones of the virtual machines 302-1, 302-2, . . . 302-M under the control of the hypervisor 304.

The cloud infrastructure 300 may encompass the entire system 100 or only portions of that system, such as one or more of prover 102, servers 106 or controller 108 in the system 100.

Although only a single hypervisor 304 is shown in the embodiment of FIG. 3, the system 100 may of course include multiple hypervisors each providing a set of virtual machines using at least one underlying physical machine.

An example of a commercially available hypervisor platform that may be used to implement hypervisor 304 and possibly other portions of system 100 in one or more embodiments of the invention is the VMware® vSphere™ which may have an associated virtual infrastructure management system such as the VMware® vCenter™. The underlying physical machines may comprise one or more distributed processing platforms that include storage products, such as VNX and Symmetrix VMAX, both commercially available from EMC Corporation of Hopkinton, Mass. A variety of other storage products may be utilized to implement at least a portion of system 100.

Figure 4:
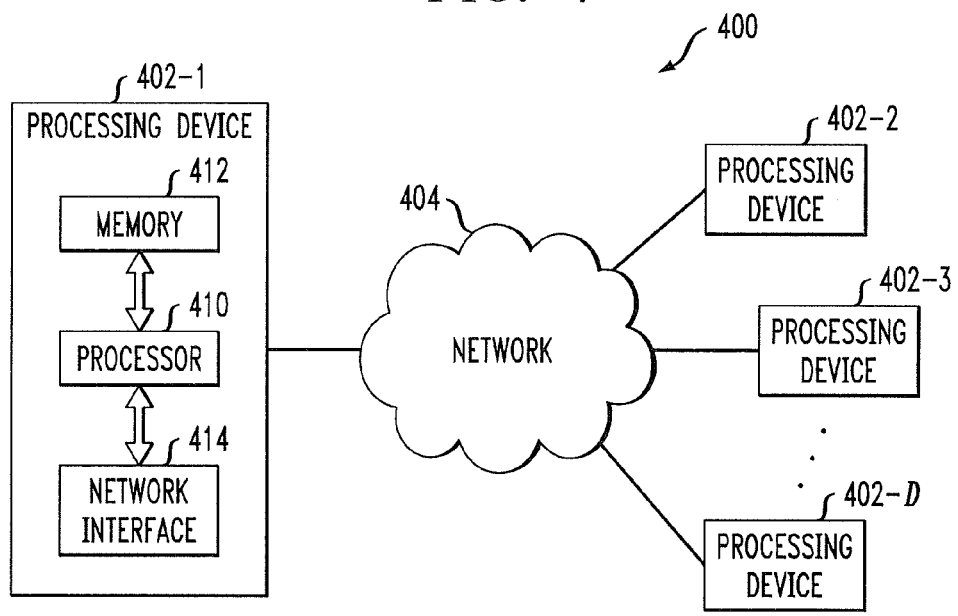

Another example of a processing platform is processing platform 400 shown in FIG. 4. The processing platform 400 in this embodiment comprises at least a portion of the system 100 and includes a plurality of processing devices, denoted 402-1, 402-2, 402-3, . . . 402-D, which communicate with one another over a network 404. The network 404 may comprise any type of network, such as a WAN, a LAN, a satellite network, a telephone or cable network, a cellular network, a wireless network such as WiFi or WiMAX, or various portions or combinations of these and other types of networks.

The processing device 402-1 in the processing platform 400 comprises a processor 410 coupled to a memory 412. The processor 410 may comprise a microprocessor, a microcontroller, an ASIC, an FPGA or other type of processing circuitry, as well as portions or combinations of such circuitry elements, and the memory 412, which may be viewed as an example of a "computer program product" having executable computer program code embodied therein, may comprise RAM, ROM or other types of memory, in any combination.

Also included in the processing device 402-1 is network interface circuitry 414, which is used to interface the processing device with the network 404 and other system components, and may comprise conventional transceivers.

The other processing devices 402 of the processing platform 400 are assumed to be configured in a manner similar to that shown for processing device 402-1 in the figure.

Again, the particular processing platform 400 shown in the figure is presented by way of example only, and system 100 may include additional or alternative processing platforms, as well as numerous distinct processing platforms in any combination, with each such platform comprising one or more computers, storage devices or other processing devices.

Multiple elements of system 100 may be collectively implemented on a common processing platform of the type shown in FIG. 3 or 4, or each such element may be implemented on a separate processing platform.

It should again be emphasized that the above-described embodiments of the invention are presented for purposes of illustration only. Many variations and other alternative embodiments may be used. For example, the techniques are applicable to a wide variety of other types of cryptographic devices and authentication systems that can benefit from distributed challenge-response authentication as disclosed herein. Also, the particular configuration of communication system and processing device elements shown in FIGS. 1-4, and the associated distributed challenge-response authentication techniques, can be varied in other embodiments. Moreover, the various simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method comprising:
   storing in a plurality of servers respective shares of a set of challenge-response pairs;
   sending a particular challenge of one of the challenge-response pairs to a prover;
   receiving a response to the particular challenge; and
   authenticating the received response as an appropriate response to the particular challenge based on indications from respective ones of at least a subset of the servers as to whether or not the received response matches respective reconstructed responses computed by those servers;
   wherein the reconstructed responses comprise respective reconstructed versions of a response in the set of challenge-response pairs; and
   wherein the servers of said subset compare their respective reconstructed versions to the received response in generating respective ones of the indications.

2. The method of claim 1 wherein sending the particular challenge comprises:
  reconstructing in a given one of the servers the particular challenge of one of the challenge-response pairs using information associated with the share stored in the given server and information associated with at least one other share stored in at least one other server of the plurality of servers; and
  sending the reconstructed challenge to the prover as the particular challenge.

3. The method of claim 1 wherein at least a given one of the servers computes its reconstructed response using information associated with the share stored in that server and information associated with at least one other share stored in at least one other server of the plurality of servers.

4. The method of claim 1 wherein each of the challenge-response pairs and corresponding portions of the shares are utilized for only a single authentication session.

5. A method comprising:
  storing in a plurality of servers respective shares of a set of challenge-response pairs;
  sending a particular challenge of one of the challenge-response pairs to a prover;
  receiving a response to the particular challenge; and
  authenticating the received response as an appropriate response to the particular challenge based on indications from respective ones of at least a subset of the servers as to whether or not the received response matches respective reconstructed responses computed by those servers;
  wherein the set of challenge-response pairs comprises a set of n challenge-response pairs $\{(c_i, r_i)\}_{i=1}^n$ computed using a symmetric key $\kappa$ selected from a keyspace K.

6. The method of claim 5 wherein the set of n challenge-response pairs comprises a set of n challenge-response pairs $\{c_i, r_i = f_\kappa(c_i)\}_{i=1}^n$ where $c_i \in_R K$ and $f_\kappa(c_i) \in K$ is a symmetric-key primitive based on the symmetric key $\kappa$.

7. The method of claim 6 wherein the plurality of servers comprises at least first and second servers and wherein the share for the first server comprises a set $\{c_i \oplus q_i, r_i \oplus s_i\}_{i=1}^n$ and the share for the second server comprises a set $\{q_i, s_i\}_{i=1}^n$, where $s_i \in_R K$.

8. The method of claim 7 further comprising reconstructing in the first server a particular challenge $c_j$ for a current authentication session identified by a session counter j, wherein reconstructing $c_j$ comprises:
  the first server receiving $q_j$ from the second server; and
  the first server reconstructing $c_j$ by computing $c_j = (c_j \oplus s_j) \oplus s_j$;
  wherein $c_j$ denotes a challenge of a j-th one of the challenge-response pairs in the set of n challenge-response pairs and j=1, . . . n; and
  wherein the reconstructed challenge $c_j$ is sent to the prover.

9. The method of claim 8 wherein the received response to the reconstructed challenge comprises a response of the form $r'_j = f_\kappa(c_j)$.

10. The method of claim 9 wherein said authenticating comprises:
  each of the first and second servers reconstructing response $r_j$ corresponding to reconstructed challenge $c_j$ of the j-th one of the challenge-response pairs in the set of n challenge-response pairs;
  each of the first and second servers generating an accept indication if $r'_j = r_j$ at that server and otherwise generating a reject indication; and
  each of the first and second servers deleting its share of the j-th challenge-response pair and then incrementing the session counter j.

11. The method of claim 10 wherein reconstructing response $r_j$ in a given one of the first and second servers comprises computing $r_j = (r_j \oplus s_j) \oplus s_j$.

12. The method of claim 11 wherein the first server sends a commitment $\gamma = \text{commit}(r_j \oplus s_j)$ to the second server, receives $s_j$ from the second server in response to the commitment, and the first server subsequently sends a decommitment decommit($\gamma, r_j \oplus s_j$) to the second server, such that both servers are able to compute $r_j = (r_j \oplus s_j) \oplus s_j$.

13. The method of claim 1 further comprising periodically applying a proactivation process to adjust the set of challenge-response pairs and the associated shares stored in the respective servers.

14. The method of claim 1 wherein said authenticating comprises accepting the received response as a valid response only if a specified threshold number of the servers each indicates that the received response matches the reconstructed response computed by that server.

15. A processing device comprising a processor coupled to a memory and configured to perform the method of claim 1.

16. A computer program product comprising a non-transitory processor-readable storage medium having embodied therein one or more software programs, wherein the one or more software programs when executed by at least one processing device cause the method of claim 1 to be performed.

17. A method comprising:
  storing in a given server a share of a set of challenge-response pairs;
  sending a particular challenge of one of the challenge-response pairs to a prover;
  receiving a response to the particular challenge;
  generating an indication as to whether or not the received response matches a reconstructed response computed by the given server;
  wherein the indication is utilizable in conjunction with corresponding indications generated by respective other servers to authenticate the received response as an appropriate response to the particular challenge; and
  authenticating the received response as the appropriate response to the particular challenge based on indications from respective ones of at least a subset of the servers as to whether or not the received response matches respective reconstructed responses computed by those servers;
  wherein the reconstructed responses comprise respective reconstructed versions of a response in the set of challenge-response pairs; and
  wherein the servers of said subset compare their respective reconstructed versions to the received response in generating respective ones of the indications.

18. The method of claim 17 wherein sending the particular challenge comprises:
  reconstructing in the given server the particular challenge of one of the challenge-response pairs using information associated with the share stored in the given server and information associated with at least one other share stored in at least one other server of the plurality of servers; and
  sending the reconstructed challenge to the prover as the particular challenge;
  the method further comprising:
  authenticating the received response as an appropriate response to the reconstructed challenge based on the indications from the respective ones of at least the subset of the servers as to whether or not the received response matches the respective reconstructed responses computed by those servers.

19. An apparatus comprising:

a server comprising a memory and a local verifier;

the server being configured to store in the memory a share of a set of challenge-response pairs;

wherein a particular challenge of one of the challenge-response pairs is sent to a prover;

the local verifier being configured to generate an indication as to whether or not a received response to the particular challenge matches a reconstructed response computed by the server;

wherein the indication is utilizable in conjunction with corresponding indications generated by respective other servers to authenticate the received response as an appropriate response to the particular challenge; and a controller comprising a global verifier;

the global verifier being configured to authenticate the received response as an appropriate response to the particular challenge based on indications from respective ones of at least a subset of the servers as to whether or not the received response matches respective reconstructed responses computed by those servers;

wherein the reconstructed responses comprise respective reconstructed versions of a response in the set of challenge-response pairs; and wherein the servers of said subset compare their respective reconstructed versions to the received response in generating respective ones of the indications.

20. The apparatus of claim 19 wherein at least a portion of the controller is implemented in one or more of the servers.

21. The apparatus of claim 19 wherein at least a portion of the controller is implemented in an additional server.

22. A verifier comprising:

a plurality of servers; and a controller associated with the servers;

wherein the controller is configured to provide to the plurality of servers respective shares of a set of challenge-response pairs; and wherein a particular challenge of the challenge-response pairs is sent to a prover;

each of the servers comprising a local verifier being configured to respectively generate an indication as to whether or not a received response to the particular challenge matches respective reconstructed responses computed by those servers;

the controller comprising a global verifier configured to authenticate the received response as an appropriate response to the reconstructed challenge based on the indications generated by at least a subset of the servers;

wherein the reconstructed responses comprise reconstructed versions of a response in the set of challenge-response pairs; and wherein the servers of said subset compare their respective reconstructed versions to the received response in generating respective ones of the indications.

23. The verifier of claim 22 wherein at least a given one of the servers is configured to reconstruct the particular challenge of one of the challenge-response pairs using information associated with the share stored in the given server and information associated with at least one other share stored in at least one other server of the plurality of servers, thereby permitting the reconstructed challenge to be sent to the prover as the particular challenge.

* * * * *

UNITED STATES PATENT AND TRADEMARK OFFICE
CERTIFICATE OF CORRECTION

PATENT NO. : 8,977,847 B1
APPLICATION NO. : 13/798542
DATED : March 10, 2015
INVENTOR(S) : Ari Juels Page 1 of 1

It is certified that error appears in the above-identified patent and that said Letters Patent is hereby corrected as shown below:

In the Specification

Column 6, line 30, please change " $\{c_i \oplus q_{i,q}, r_q \oplus s_i\}_{i=1}^n$ " to -- $\{c_i \oplus q_i, r_i \oplus s_i\}_{i=1}^n$ --

Column 8, line 29, please change "S$_i$" to -- S$_1$ --

Signed and Sealed this
Sixteenth Day of June, 2015

Michelle K. Lee
*Director of the United States Patent and Trademark Office*